Patented Feb. 6, 1945

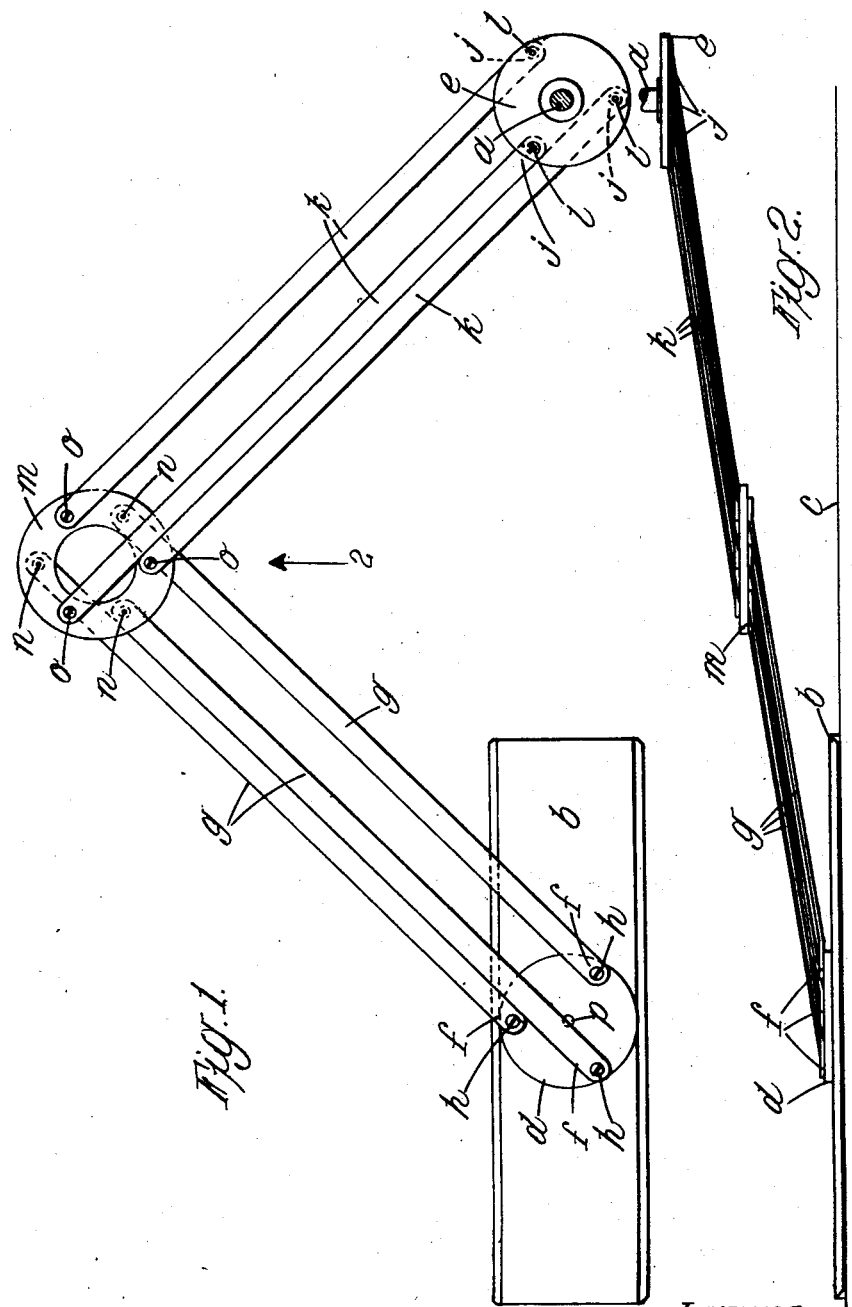

2,368,813

UNITED STATES PATENT OFFICE 2,368,813

MOTION TRANSMITTING LINKWORK

Philip Francis Everitt, Ilford, England, assignor of one-half to Henry Hughes & Son Limited, London, England, a British limited-liability company Application August 13, 1943, Serial No. 498,516
In Great Britain August 17, 1942

6 Claims. (Cl. 33—79)

This invention relates to improvements in motion transmitting linkwork and has particular reference to the parallel motion linkwork coupling a chart rule with the main actuating spindle of trigonometrical computing devices such as apparatus for solving triangles.

The object of the invention is to provide relatively simple, robust and inexpensive mechanism by which the computing device, which is mounted on a fixed chart, can, in effect, be turned relatively to the chart without disturbing the physical relationship.

The invention further provides means by which the positive relation of the edge of the chart rule can easily be adjusted relatively to the datum line of the computing device.

In ordinary drafting machines the ruler is mounted on a free terminal that is connected to a junction element by two equiangularly related similar parallel motions, each of which is a closed kinematic four link chain with parallel cranks of the same length and the junction element in turn is connected to a stationary bracket (mounted on the drawing board) by two angularly related similar parallel motions each of which also is a closed kinematic four link chain with parallel cranks of the same length.

Such an arrangement on the one hand, allows the ruler to be moved over the drawing board without undesirable constraint and on the other hand, operates rigidly to maintain the edge of the ruler parallel with a given line regardless of the linear displacements of said ruler up and down or to and fro on the drawing board but is quite unsuited to transmit continuous rotation of a free terminal to and from a junction element owing to the ambiguous conditions that occur in the linkwork at points in the rotation separated by the pivot pitch when it is approximately 180 angular degrees.

To transmit the rotation of a free terminal to and from a junction element smoothly and continuously, at least three kinematic chains of the kind referred to superimposed in angular relation must be used.

The invention consists in improved motion transmitting linkwork characterized in that the rotation of a free terminal is accurately transmitted to a junction element and from said junction element to a spindle by sets of three or more parallel motions.

Generally, the improved motion transmitting linkwork permits of unconstrained linear displacement of a terminal over a limited chart surface and transmits any rotary movement of said terminal accurately to a junction element and from the junction element to a spindle. To this end the free terminal is connected to the junction element by three or more angularly related similar parallel motion transmitting means each of which forms a closed kinematic four link chain with parallel cranks of the same length. The junction element similarly is connected to said spindle by three or more angularly related similar parallel motions, each of which is a closed kinematic four link chain with parallel cranks of the same length so that when said improved linkwork is applied to a trigonometrical computing device of the kind referred to, the angular relationship of the device to the chart can, in effect, be changed by rotating the chart rule without disturbing the physical relationship of the device to the chart.

In order that this invention may be the better understood, an example will now be described in relation to the accompanying drawing, reference being had to the figures thereof in which similar letters refer to similar parts and in which:

Figure 1 is a diagrammatic plan view of the improved linkwork; and

Figure 2 is a side elevation of Figure 1 looking in the direction of the arrow 2 in that figure.

In the arrangement shown in the drawing, $a$ is the main actuating spindle of the trigonometrical computing device, which is of fixed location and $b$ is the chart rule which can be moved over the surface $c$ of the chart (in Figure 1 represented by the surface of the paper).

The rule $b$ is mounted on the free terminal or carrier $d$ which is in the form of a disc somewhat similar to the disc or flange $e$ mounted on the spindle $a$.

The carrier $d$ and the flange $e$ each has one end of each of six links pivotally mounted thereon, that is to say, one end $f$ of each of the three links $g$ is connected to the carrier $d$ by a pivot $h$ and one end $j$ of each of the three links $k$ is connected to the flange $e$ by a pivot $l$, the three pivots $h$ and $l$ (in effect forming sets of cranks) being equiangularly spaced and located at an equal distance from the centers of rotation of $d$ and $e$, respectively.

The other ends of the links $g$ and $k$ are connected to a junction element $m$ by pivots $n$ and $o$ respectively which are equiangularly spaced and located at a distance from the centre of the element $m$ equal to the distances of the pivots $h$ and $l$ from the centres of rotation of the carrier $d$ and flange $e$, thus forming two associated sets of cranks.

In the drawing, the length of the links $g$ is equal to that of the links $k$ and for purposes of construction, the pivots $h$ are on the upper side of the carrier $d$, relatively to the surface $c$ of the chart, whilst the pivots $l$ are on the underside of the flange $e$, the pivots $n$ being arranged on the under surface of the element $m$, whilst the pivots $o$ are arranged on the upper surface thereof.

Such an arrangement complies with all the geometrical requirements and whilst allowing of unrestrained linear displacement of the centre of the carrier $d$ within the limited area of the surface $c$ of the chart by virtue of the parallel motions, also enables rotation of the carrier $d$ about its centre to be faithfully transmitted to the spindle $a$ by virtue of the two sets of three angularly related closed kinematic chains.

To simplify the description as much as possible the radial distances of all the pivots $h$, $l$, $n$ and $o$ have been referred to as being similar, but obviously if the radial distances of the pivots $h$ are the same as the radial distances of the pivots $n$ and the radial distances of the pivots $l$ are the same as the radial distances of the pivots $o$ it is immaterial whether the radial distances of the pivots $n$ are equal to the radial distances of the pivots $o$ or not, they may be greater or less to suit any constructional requirements.

Further, the number of angularly related closed kinematic chains included in a set need not be limited to three, which is the minimum possible, nor need the number of chains in one set be equal to the number of chains in the other set provided that three or more are used in each set.

Further, although in the example described the closed kinematic chains in each set are shown and described as equiangularly related to one another, provided that the cranks of one group, say those on the carrier $d$, are similarly related angularly to the cranks of the associated group on the junction element $m$ it is immaterial whether the angles between the cranks are the same or not.

In order that the scope and freedom of operation shall be unrestricted, other than by dimensional limitations, the ends of the links $g$ and $k$ are offset, as shown in Figure 2 for example, to avoid any fouling during movement over the surface $c$ of the chart.

As in some cases it is necessary or convenient to adjust the edge of the chart rule $b$ relatively to the datum line of the computing device of which $a$ is the spindle, the rule $b$ is pivoted on the carrier $d$, usually at the geometrical centre $p$ of the three pivots $h$, so that it can be turned without rotating the spindle $a$, frictional or other gripping means being provided by which the rule $b$ is retained in adjusted position with sufficient security to transmit rotatory movements during ordinary use.

As shown in the drawing the junction element $m$ is supported through the links $g$ and $k$ but in practice a carriage, that glides with a minimum of friction on the surface $c$, is provided, said carriage co-operating with the edge of said element by means of roller, ball or similar antifriction bearings.

I claim:

1. A motion transmitting device comprising a rotatably mounted spindle, a terminal member, a junction element, at least three parallel means rotatably connected to said terminal element and said junction element at angularly related points, and at least three parallel means rotatably connected to said junction element and said spindle at angularly related points whereby rotation of said terminal element causes equal rotation of said spindle.

2. A motion transmitting linkwork comprising a rotatably mounted spindle, a junction member, at least three links each having one end connected rotatably to said spindle at angularly related points spaced equally from the axis of said spindle, means rotatably connecting the links in parallel relationship to said junction member at points equidistant from the points of connection with said spindle, a terminal member, at least three additional links connected rotatably and in parallel relationship to said junction member and said terminal element, the lengths of the additional links between the points of connection being equal and the points of connection being spaced angularly and equidistant from points on said junction member and on said terminal element.

3. A motion transmitting linkwork comprising a spindle, a junction element, a terminal, each having a center of rotation, at least three parallel links having opposite ends connected rotatably to said spindle and said junction element at angularly related points spaced equidistant from their centers of rotation, and at least three additional parallel links having opposite ends connected rotatably to said junction and said terminal elements at angularly related points spaced equidistant from their centers of rotation.

4. The motion transmitting linkwork set forth in claim 3 in which the terminal element is provided with a chart rule and the spindle is connected to a computing device.

5. The motion transmitting linkwork set forth in claim 3 in which the ends of said links are offset and said additional links are connected to the one side of said junction element and the other links are connected to an opposite side of said junction element.

6. A motion transmitting device comprising a rotatably mounted spindle having angularly spaced crank means thereon, a terminal member having angularly spaced crank means thereon, a junction element having crank means thereon spaced angularly equally to the spacing of the crank means on said spindle and said terminal member, at least three links connecting the crank means on said spindle and said junction element, and at least three links connecting the crank means on said junction element and on said terminal member, said connected crank means being of such length that upon rotation of said terminal element, the links connected thereto have parallel motions to rotate said junction element and the links connected to said spindle have parallel motions to rotate said spindle.

PHILIP FRANCIS EVERITT.